United States Patent [19]
Jung

[11] Patent Number: 6,145,661
[45] Date of Patent: Nov. 14, 2000

[54] BAG FOR NOTEBOOK COMPUTER INCLUDING ANGULAR MOTION RESTRAINT

[76] Inventor: Jung-Sook Jung, 310-703 Saebyul Maeul, Pundang-dong, Pundang-gu, Seongnam-city, Kyungki-do, Rep. of Korea

[21] Appl. No.: 09/274,927

[22] Filed: Mar. 23, 1999

[30] Foreign Application Priority Data

Jan. 16, 1999 [KR] Rep. of Korea .......................... 99-1206
Feb. 19, 1999 [KR] Rep. of Korea .......................... 99-5600

[51] Int. Cl.⁷ .............................. B65N 85/00; A45C 13/34
[52] U.S. Cl. ........................... 206/320; 190/102; 190/106; 190/113; 206/305
[58] Field of Search ..................................... 206/320, 305; 190/102, 106, 110, 900–902, 113; 108/43

[56] References Cited

U.S. PATENT DOCUMENTS

| | | | |
|---|---|---|---|
| 4,837,590 | 6/1989 | Sprague | 206/320 X |
| 4,911,272 | 3/1990 | Mainville | 190/106 |
| 5,379,893 | 1/1995 | Ruiz | 206/320 |
| 5,400,903 | 3/1995 | Cooley | 206/320 |
| 5,576,929 | 11/1996 | Uchiyama et al. | 206/305 X |
| 5,647,484 | 7/1997 | Fleming | 206/320 X |
| 5,682,993 | 11/1997 | Song | 206/320 |
| 5,706,992 | 1/1998 | Moor | 190/102 X |
| 5,724,225 | 3/1998 | Hrusoff et al. | 206/305 X |
| 5,762,250 | 6/1998 | Carlton et al. | 206/320 X |
| 5,857,568 | 1/1999 | Speirs | 206/320 |
| 5,881,850 | 3/1999 | Murdoch | 190/110 |
| 5,938,096 | 8/1999 | Sauer et al. | 206/320 X |

*Primary Examiner*—Bryon P. Gehman
*Attorney, Agent, or Firm*—Rosenthal & Osha L.L.P.

[57] ABSTRACT

A bag for a notebook computer which allows easy use of the computer while still maintained in the computer bag. The bag includes a body for receiving a notebook computer therein, and a cover pivotally coupled along one side to the body to enable opening motion of the cover. The bag further includes an angular motion restraint which couples the cover of the bag to the body of the bag, so that the cover opening approximately corresponds to the opening of the computer display panel. In one embodiment of the invention, the angular motion restraint includes a restraining band. The restraining band has one end fixed to the body of the bag and the other end fitted with a first fastener part. The first fastener part of the restraining band is attachable to a second faster part which is attached to an inner surface of the cover.

8 Claims, 9 Drawing Sheets

BAG FOR NOTEBOOK COMPUTER INCLUDING ANGULAR MOTION RESTRAINT

BACKGROUND OF THE INVENTION

1. Field of the Invention

The present invention relates to a bag, and more particularly to a bag for a notebook computer which can be easily used without bothering to take out the computer therefrom.

2. Description of the Prior Art

A conventional bag for notebook computer (hereinafter referred to as bag) includes, as illustrated in FIG. 1, a cover 2 at an opening of a body 1, cushioning means 4 at both inner sides of the body 1 for protection of object inside the body and a handle 6 in front of the body.

The cover 2 is coupled at both sides thereof to zippers along the body 1 and is combined to the body 1 at the rear side thereof.

However, there is a problem in the conventional bag in that the cover should be flung over backward to use to notebook computer in the bag, providing a discomfort to the other person sitting back and serving no useful purpose behind the bag. Furthermore, there is another problem in that it is inconvenient to use the computer unless taken out of the bag due to complicated electrical cords and interference by the cover.

SUMMARY OF THE INVENTION

The present invention is disclosed to solve the aforementioned problems and it is an object of the present invention to provide a bag for a notebook computer adapted for easy use without bothering to take out the computer therefrom and for providing no discomfort to other users to thereby allow space behind the bag to be fully utilized.

In accordance with the object of the present invention, there is provided a bag for a notebook computer having a body for accommodating a notebook computer therein and a cover coupled at one side thereof to the body and flingable over backward when the bag is opened, wherein the cover is not fully flung over backward in the same direction as the opening direction of a display panel of the computer, but flung over only at the same angle as that of the display panel by way of restraint of restraining means.

The restraining means includes a restraining band fixed at one end thereof to the body and employing hook and loop fastener such as touch fasteners sold under the trademark VELCOR® (hereinafter called as fastener) at the other end thereof and a fastener part formed on an inner floor surface of the cover so as to be attached to the fastener part of the restraining band.

It is preferable that an additional fastener part be formed at an opposite surface on the restraining band where the fastener part is formed and the body is coupled at an inner front side thereof to a band equipped with a fastener part so as to fasten a fastener of the restraining band, such that the notebook computer accommodated in the body won't be shaken to thereby be fixed therein.

The restraining means may comprise a restraining band having one side thereof being fixed to the body and the other side thereof having a loop, and an inserting part coupled to an inner floor surface of the cover so that the loop of the restraining band can be hitched thereat.

It is preferable that the body is formed at a side thereof with a hole for an electric cord for supplying a power to the notebook computer accommodated therein to pass through.

The body may comprise at a side thereof a partially-cut part where a flange cover coupled by zippers is disposed.

The body may be provided with a front opening part which is covered by a front cover extensively formed on a floor surface of the body while ends of the front cover are fixed to upper surfaces of the cover.

It is preferable that the front cover is provided at an inner surface thereof with a wrist protective pad so that hands can be comfortably placed thereon when the front cover is flung open to the front direction.

The restraining means may comprise a restoring band coupled to the cover for providing a resilient force to a direction to which the cover is closed.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiments of the present invention will now be described in detail with reference to the accompanying drawings.

Figure 1:
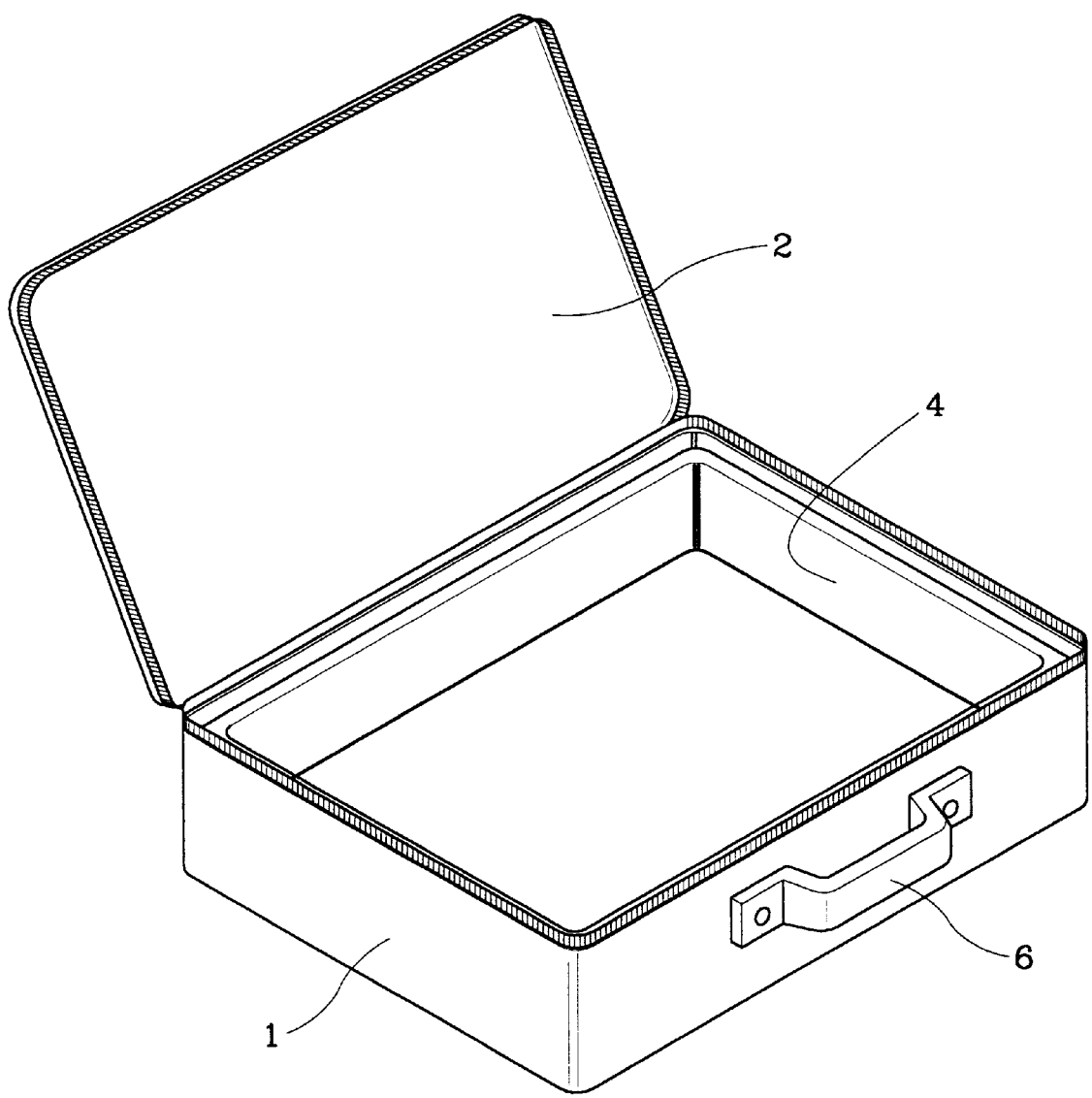
FIG. 1 is a perspective view for illustrating a conventional bag which is opened.
Figure 2:
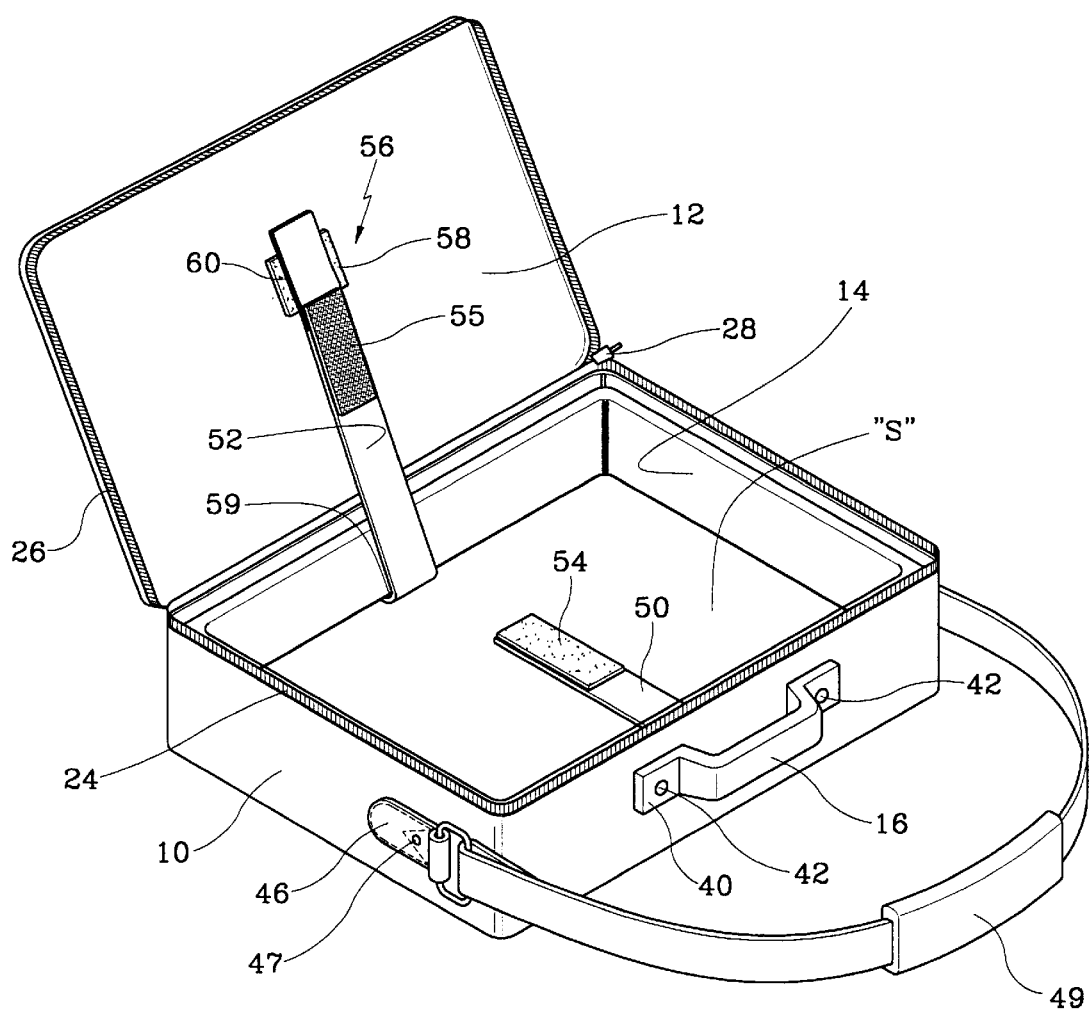
FIG. 2 is a perspective view for illustrating a bag according to a first embodiment of the present invention which is opened.

FIG. 2 is a perspective view for illustrating a bag for a notebook computer according to the first embodiment of the present invention, where the bag is provided a body 10, a space (S) for accommodating a notebook computer, a cover 12 at an opening of the body 10 and cushioning means 14 disposed at both inner fringes of the body 10 for protection of the notebook computer from outside shock.

The body 10 is arranged at a front side thereof with a handle 16 for carrying of the bag, and the body 10 and cover 12 are disposed on inner floors thereof with sponge, where the sponge is wrapped and stitched by cloth.

The body 10 and the cover 12 are joined at rear fringes thereof and other fringes of the body 10 and cover 12 are attachable/detachable by zippers. In other words, the body 10 and the cover 12 are respectively formed at three fringes thereof with zipper teeth 24 and 26 and a slider 28 for opening/separating the space (S) bites the zipper teeth 24 and 26, moving along the teeth 24 and 26. Although the present embodiment is based one slide 28, two slides moving at both directions are possible.

The cushioning means 14 is disposed therein with styrofoam, sponge and the like having a predetermined strength and cloth wraps the cushioning means 14. The handle 16 is fixed at base part 40 thereof by rivets 42 as illustrated in FIG. 2. The body 10 is equipped with a shoulder strap 44 for easy hand carry and the shoulder strap 44 is fixed at bases 46 thereof by pins 47. The shoulder strap 44 is hitched by the base 46 via a loop and is centrally disposed with a sticking member 49 made of soft, shock-absorbing material.

The body 10 is coupled therein to a restraining band 52 and a band 50 to prevent a notebook computer from being shaken. The band 50 is fixed to an inner front side of the body 10 while the restraining band 52 is fixed to a rear inner side of the body 10. The band 50 and restraining band 52 are respectively formed with fastener parts 54 and 55 which are correspondingly coupled thereto so as to tightly secure the notebook computer accommodated in the space (S) of the body.

Furthermore, restraining means 56 is provided in order to prevent the cover 12 from fully flung over when the cover 12 is opened. The straining means 56 includes a fastener part 58 on an inner floor surface of the cover 12. Another fastener part 60 is arranged at the restraining band 52 on a surface facing the cover 12. In other words, the restraining band 52 also functions as restraining means 56 restraining the cover 12. It is preferred that the restraining band 52 is coupled at a root area thereof to a holding member 59 in order to tighten the cover 12 when the restraining band 52 restrains the cover 12.

There is an advantage in the bag for notebook computer according to the first embodiment of the present invention in that when the cover 12 is opened and the fastener part 60 of the restraining band 52 is attached to the fastener part 58 of the cover 12, the cover 12 is not flipped backward only to be slantly stood such that a notebook computer (C) is not needed to be taken out of the body and space behind the cover can be utilized not to interfere with other persons positioned therebehind.

Figure 3:
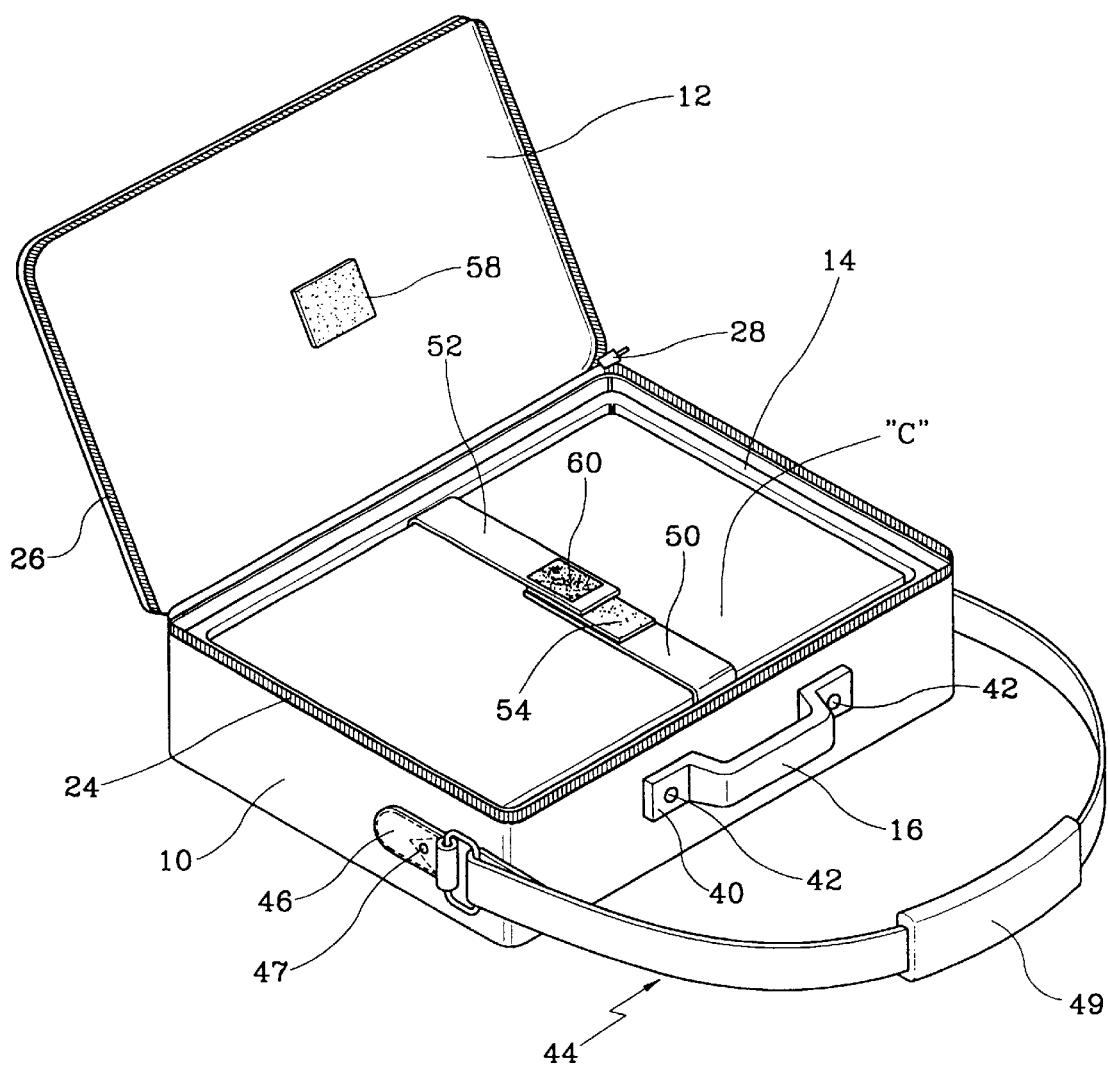
FIG. 3 is a constitutional diagram of use of a bag for notebook computer according to the first embodiment of the present invention.

Furthermore, there is another advantage in the bag for notebook computer according to the first embodiment of the present invention in that the notebook computer (C) is not shaken inside the body 10 to thereby prevent shock applied thereto when the band 50 is positioned on the upper surface of the notebook computer (C) and the fastener part 55 at the restraining band 52 is coupled to the fastener part 54 of the band 50, as illustrated in FIG. 3.

Figure 4:
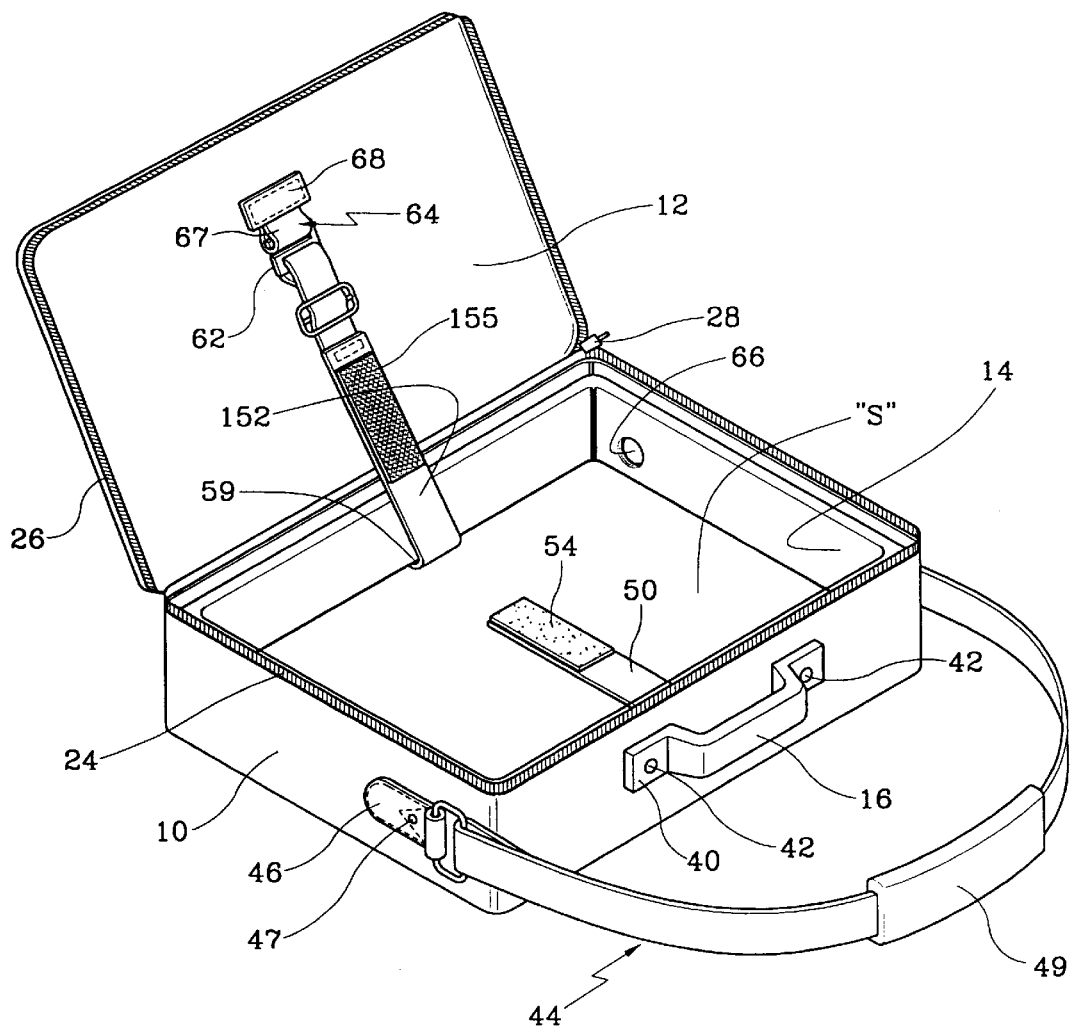
FIG. 4 is a perspective view for illustrating a bag opened for a notebook computer according to a second embodiment of the present invention.

FIG. 4 is a perspective view for illustrating a bag for a notebook computer opened according to a second embodiment of the present invention.

According to the second embodiment of the present invention, tip end of a restraining band 152 is arranged with a hook 62 and the cover 12 is coupled at an inner floor surface thereof with a loop 64 for the hook 62 to be inserted thereinto. The body 10 is further equipped at a side thereof with a hole 66 for an electric cord (not shown) to pass through. The restraining band 152 is provided thereon with a fastener part 155 so as to be coupled to the fastener part 54 of the band 50.

The hook 62 has a "⊂" shape and a long rectangular hole is formed thereunder to allow the tip end of the restraining band 152 to be inserted thereinto. The loop 64 is folded to form a short band 67 to make a hole for the hook 62 to be inserted thereinto and stitched on an inner surface of the cover 12 through a base piece 68. The cover 12 is completely secured by the hook 62 and the loop 64 according to the second embodiment of the present invention. There is an advantage in that an electric cord is passable through the hole 66 to make it easy to provide a power to the notebook computer without difficulty.

Figure 5:
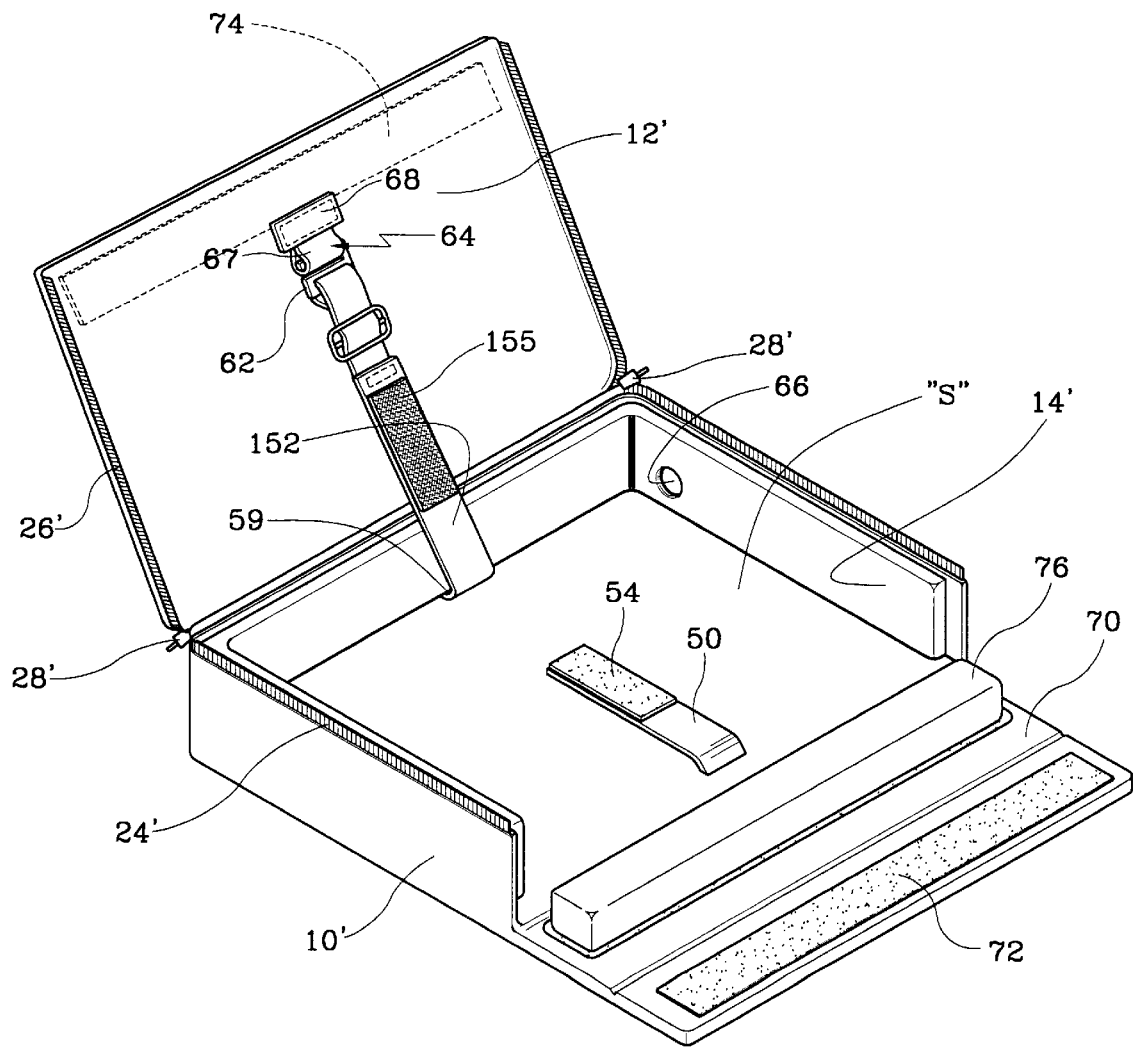
FIG. 5 is a perspective view for illustrating a bag opened for a notebook computer according to a third embodiment of the present invention.

FIG. 5 is a perspective view for illustrating a bag for a notebook computer opened according to a third embodiment of the present invention. According to the third embodiment of the present invention, a body 10' is opened at a front side thereof to provide an easier use of a notebook computer with the notebook computer positioned inside the body 10, and the bag itself and overall construction thereof are almost the same as those of the FIG. 4.

As illustrated in FIG. 5, the body 10' is opened at the front side thereof and the opened front side is wrapped up by a front cover 70 extensively formed from a floor surface of the body 10'. Tip end of the front cover 70 is secured to an upper surface of a cover 12' by a fastener part. Accordingly, upper tip end of the cover 12' is not formed with zipper teeth and the zipper is provided with two sliders 28' at both sides of the body 10' to zip the body 10'.

The front cover 70 is formed at an inner surface thereof with a fastener part 72 and the cover 12' is formed at an upper surface thereof with a fastener part 74 coupled to the fastener part 72. The front cover 70 is coupled at an inner side thereof to a wrist protector 76 to allow wrists to be positioned thereon comfortably. The wrist protector 76 is a rod with cushioned rectangular shape and is thereunder attachably and detachably coupled to an inner side surface of the front cover 70 by the fastener part.

According to the third embodiment of the present invention, it is very comfortable to use a notebook computer because the front cover 70 is opened to allow a user to punch the key board of the notebook computer. Furthermore, the wrist protector 76 supports the wrists not to give overstrain to the hands, thereby reducing fatigue to the wrists.

Figure 6:
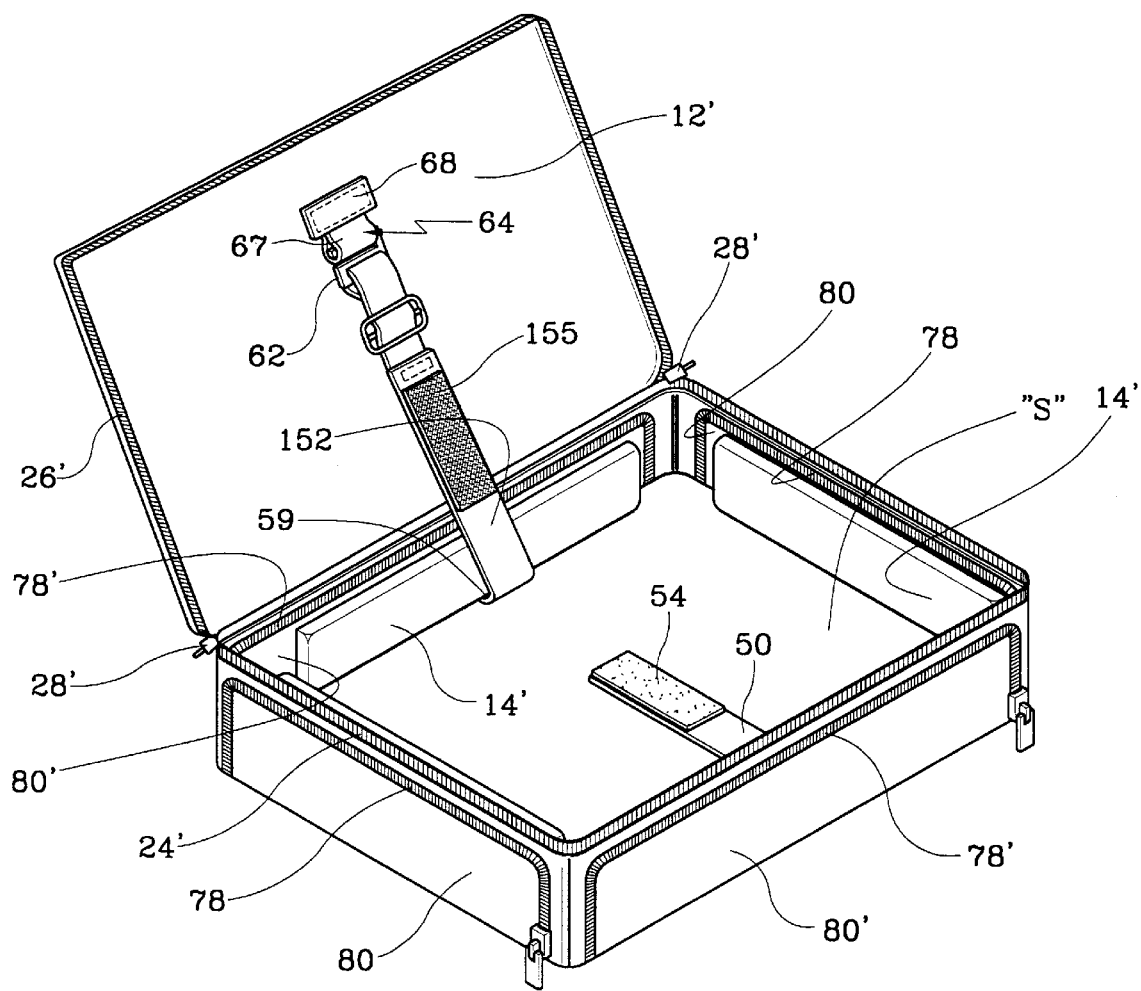
FIG. 6 is a perspective view for illustrating a bag opened for a notebook computer according to a fourth embodiment of the present invention.

FIG. 6 is a perspective view for illustrating a bag for a notebook computer opened according to a fourth embodiment of the present invention. Accordingly to the fourth embodiment of the present invention, four sides of the bag can be opened by zippers 78 and 78' which are in turn coupled to flange covers 80 and 80'. The zippers 78 and 78' are unzipped and the flange covers 80 and 80' are opened to allow electric cords to be easily connected to a notebook computer while to be easily connected to a notebook computer while the notebook computer can be easily taken out through openings formed by the flange covers 80 and 80'. At this time, cushioning means 14' are respectively formed and secured at inner sides of the flange covers 80 and 80'.

Figure 7:
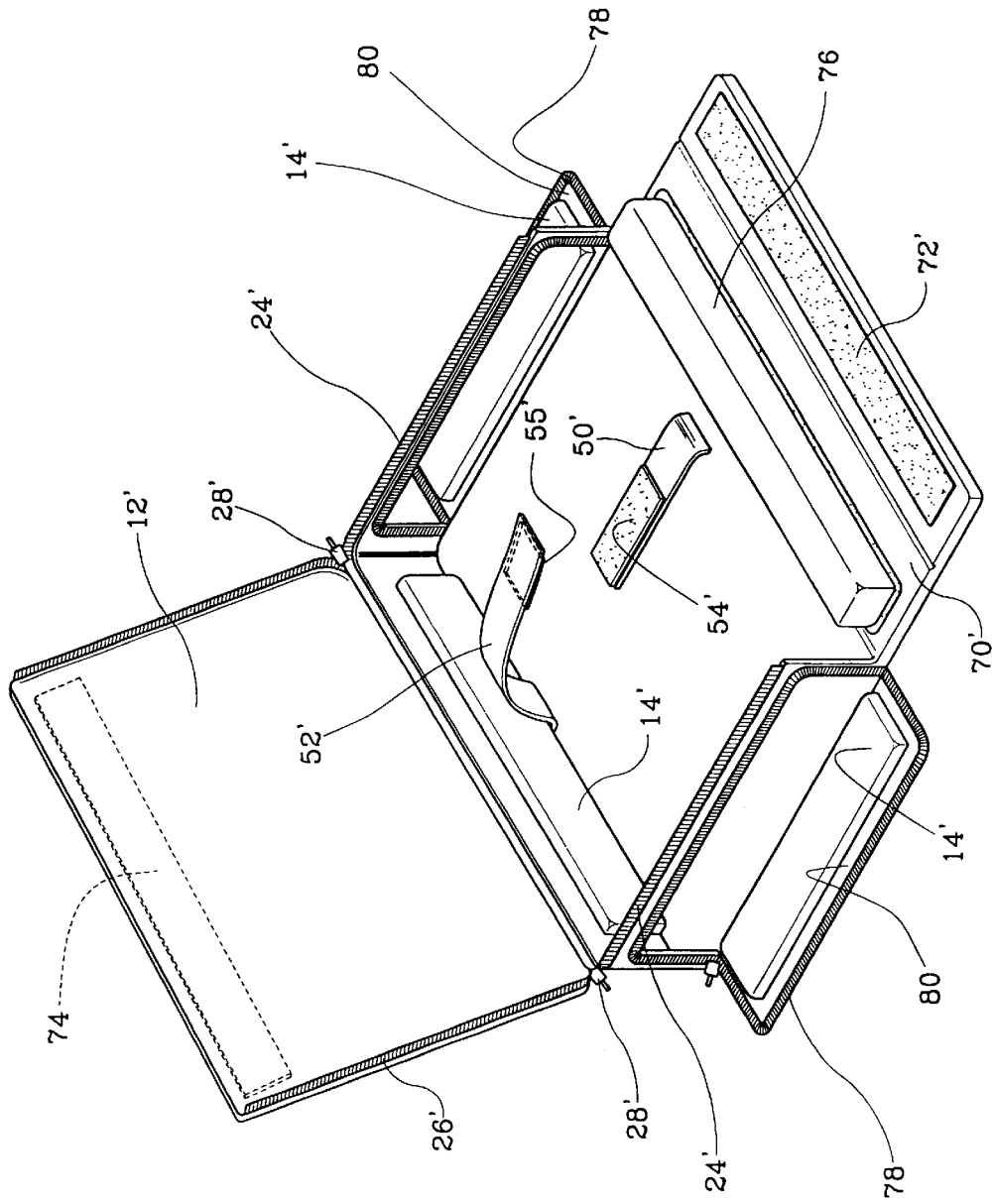
FIG. 7 is a perspective view for illustrating a bag opened for a notebook computer according to a fifth embodiment of the present invention.

FIG. 7 is a perspective view for illustrating a bag for a notebook computer according to a fifth embodiment of the present invention. The present embodiment can be said as a combination of the third embodiment and the fourth embodiment, which traditionally encases a notebook computer for hand carry and is constructed for easy use of the notebook computer.

Figure 9:
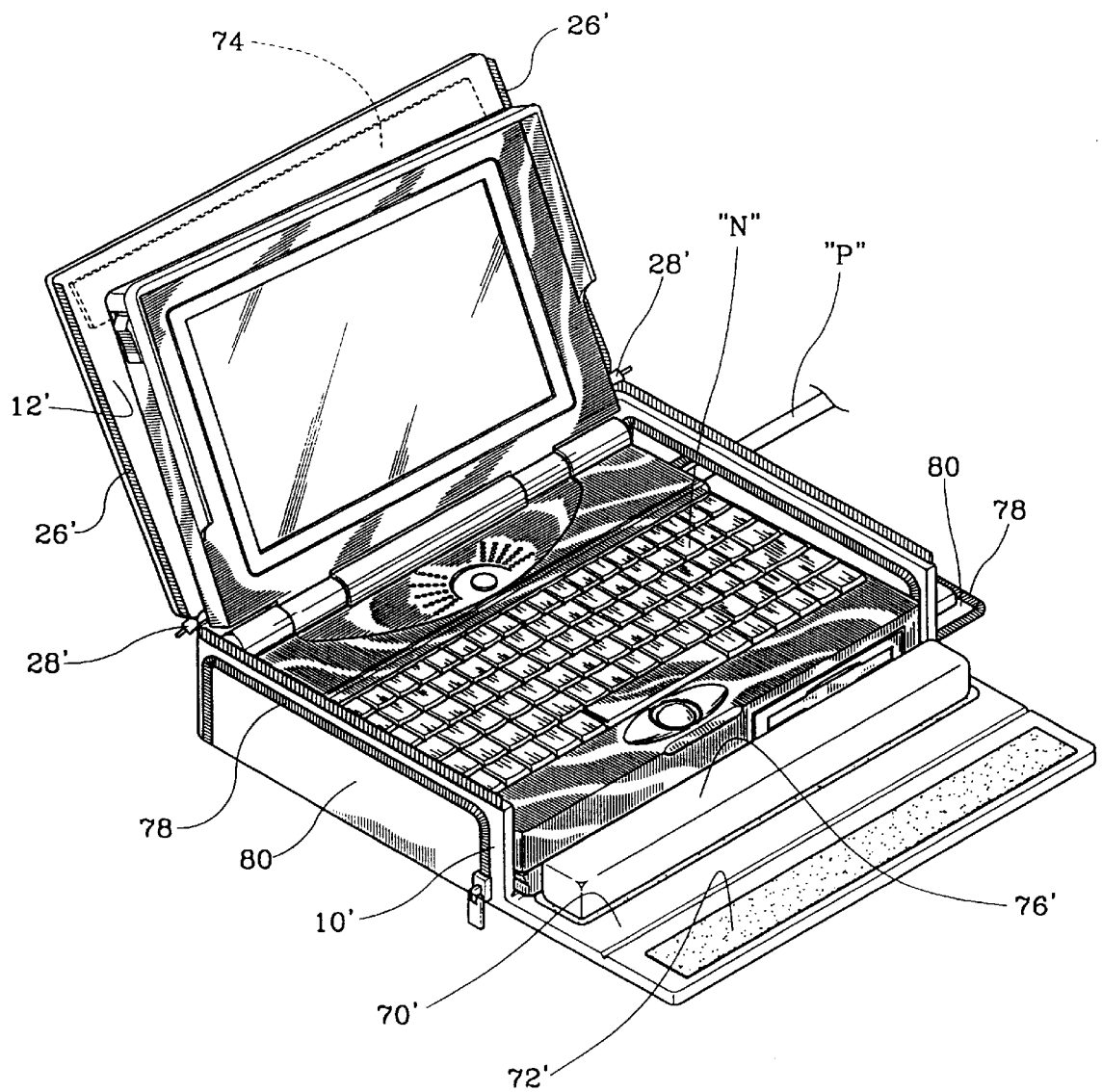
FIG. 9 is a perspective view for illustrating a bag for a notebook computer accommodated in a body of the bag according to the fifth embodiment of the present invention.

At this time, the present embodiment is provided with only a band 50' and a restraining band 52' for securing a notebook computer, where restraining means is removed and instead a restoring band 82 having a predetermined strength of restoring force is secured to an external rear side of (an area where cover and body join) of cover 12', as illustrated in FIG. 9.

The restoring band 82 provides a restoring force of shutting the cover 12' when the cover 12' is opened. Accordingly, as illustrated in FIG. 9, even though the notebook computer is opened, a display panel thereof does not cause the cover 12' of the bag to close, thereby allowing the cover 12' to stand at a predetermined angle.

The band 50' and the restraining band 52' are respectively arranged with fastener parts 54' and 55' for securing a notebook computer.

Figure 8:
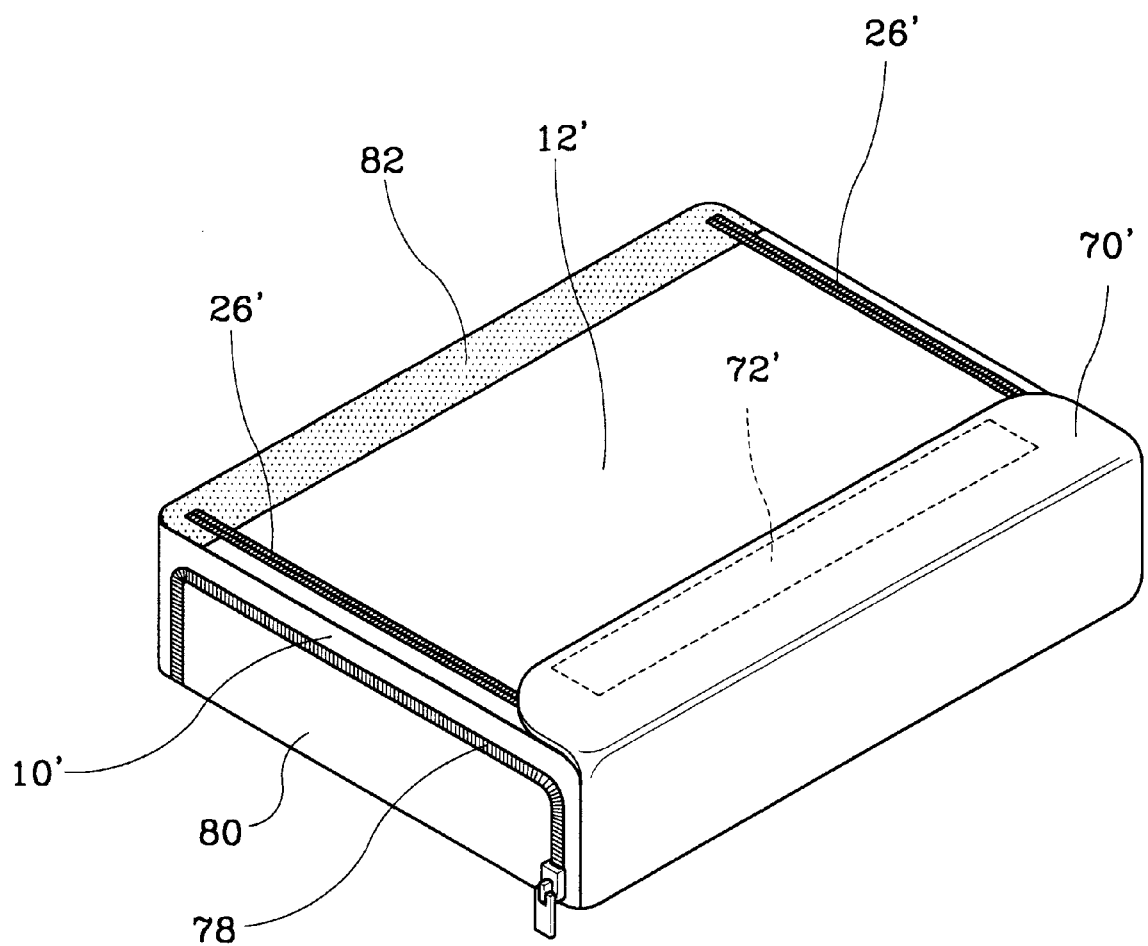
FIG. 8 is a perspective view for illustrating a bag closed according to the fifth embodiment of the present invention.

FIG. 8 is a perspective view for illustrating a bag closed according to the fifth embodiment of the present invention, and FIG. 9 is a perspective view for illustrating a bag for a notebook computer encasing a notebook computer therein for actual use.

As illustrated, when the cover 12' is opened to open a display panel of a notebook computer (N), the cover 12' is supported by the display panel of the notebook computer (N). When a front cover 70' is opened to couple the wrist protector 76' and simultaneously open a flange cover 80, to pass an electric cord (P) through an opening and to connect the power to the notebook computer, everything is ready for the notebook computer to be used.

As apparent from the foregoing, there is an advantage in the bag for notebook computer according to the present invention, in that a notebook computer can be used without bothering to be taken out of a body of the bag to thereby allow a user to utilize a space behind the bag and to provide no discomfort to other user therebehind. There is another advantage in that a rear space behind the bag can be fully utilized and the notebook computer does not need to be taken out of the bag due to comfortable wiring method of electric cord, thereby bag due to comfortable wiring method of electric cord, thereby providing a user a comfort in using the notebook computer.

In the above, the descriptions were made based on the specific embodiment of the present invention with reference to the attached drawings. However, it should be understood that the present invention is not to be limited to the specific embodiment, but various changes and modifications can be added without departing from the scope of the present invention as defined in the appended claims.

What is claimed is:

1. A bag for a notebook computer comprising:
    a body to receive the notebook computer therein;
    a cover substantially pivotally coupled along one side to said body to enable opening motion of said cover; and
    an angular motion restraint coupling said cover to said body so that the opening of said cover will approximately correspond to the opening of a display panel of the computer, the angular motion restraint comprising:
        a restraining band fixed at one end thereof to said body and having a first fastener part attached proximal to the other end thereof; and
        a second fastener part attached to an inner surface of said cover and attachable to said first fastener part of said restraining band,
    wherein said first fastener part of said restraining band comprises an insert part, and said second fastener part of said cover comprises a loop.

2. A bag for a notebook computer comprising:
    a body to receive the notebook computer therein;
    a cover substantially pivotally coupled alone one side to said body to enable opening motion of said cover; and
    an angular motion restraint coupling said cover to said body so that the opening of said cover will approximately correspond to the opening of a display panel of the computer, the angular motion restraint comprising:
        a restraining band fixed at one end thereof to said body and having a first fastener part attached proximal to the other end thereof; and
        a second fastener part attached to an inner surface of said cover and attachable to said first fastener part of said restraining band,
    wherein said first fastener part of said restraining band comprises one part of a hook and loop touch fastener, and said second fastener part of said cover comprises the other part of a hook and loop touch fastener.

3. A bag for a notebook computer comprising:
    a body to receive the notebook computer therein;
    a cover substantially pivotally coupled along one side to said body to enable opening motion of said cover; and
    an annular motion restraint coupling said cover to said body so that the opening of said cover will approximately correspond to the opening of a display panel of the computer, the angular motion restraint comprising:
        a restraining band fixed at one end thereof to said body and having a first fastener part attached proximal to the other end thereof; and
        a second fastener part attached to an inner surface of said cover and attachable to said first fastener part of said restraining band; and
        a computer restraint band coupled to said body at one end and having a third fastener part positioned proximal to the other end thereof, and said restraining band of said angular motion restraint further comprising a fourth fastener part attachable to said third fastener part on said computer restraint band to restrain the computer in said body of the bag.

4. The bag as claimed in claim 3, wherein said third fastener part of said computer restraint band comprises one part of a hook and loop touch fastener, and said fourth fastener part of said restraining band comprises the other part of a hook and loop touch fastener.

5. A bag for a notebook computer comprising:
    a body to receive the notebook computer therein;
    a cover substantially pivotally coupled along one side to said body to enable opening motion of said cover; and
    an angular motion restraint coupling said cover to said body so that the opening of said cover will approximately correspond to the opening of a display panel of the computer, said angular motion restraint comprising:
        a restraining band having one end thereof fixed to said body and the other end thereof forming a loop; and
        an inserting part coupled to an inner surface of said cover and attachable to said loop of said restraining band.

6. A bag for a notebook computer comprising:
    a body to receive the notebook computer therein;
    a cover substantially pivotally coupled along one side to said body to enable opening motion of said cover; and
    an angular motion restraint coupling said cover to said body so that the opening of said cover will approximately correspond to the opening of a display panel of the computer, said angular motion restraint comprising:
        a loop part attached to an inner surface of said cover; and
        a restraining band fixed at one end thereof to said body and coupled proximal to the other end thereof to an inserting part, said inserting part of said restraining band attachable to said loop part of said cover.

7. A bag for a notebook computer comprising:

a body to receive the notebook computer therein;

a cover substantially pivotally coupled along one side to said body to enable opening motion of said cover; and an angular motion restraint coupling said cover to said body so that the opening of said cover will approximately correspond to the opening of a display panel of the computer, said angular motion restraint comprising a restoring band coupled to said cover to provide a resilient force to said cover in a direction to which said cover is closed.

8. The bag as claimed in claim 7, wherein said restoring band comprises a plate inserted inside of said cover proximal to said one side of said cover to provide a resilient force in a direction opposite the opening of said cover when said cover is opened.

* * * * *